(12) United States Patent
Kim et al.

(10) Patent No.: US 11,713,838 B2
(45) Date of Patent: Aug. 1, 2023

(54) FITTING DEVICE FOR MAKING CONNECTION TUBE

(71) Applicant: Brian B. Kim, Flower Mound, TX (US)

(72) Inventors: Jae Gon Kim, Yangsan-Si (KR); Byong Hwan Shin, Busan (KR)

(73) Assignee: Brian Kim

( * ) Notice: Subject to any disclaimer, the term of this patent is extended or adjusted under 35 U.S.C. 154(b) by 287 days.

(21) Appl. No.: 16/175,081

(22) Filed: Oct. 30, 2018

(65) Prior Publication Data
US 2019/0309879 A1   Oct. 10, 2019

(30) Foreign Application Priority Data

Apr. 6, 2018 (KR) .................. 10-2018-0040595

(51) Int. Cl.
*F16L 15/00* (2006.01)
*F16L 19/00* (2006.01)
*F16L 15/08* (2006.01)

(52) U.S. Cl.
CPC .......... *F16L 15/008* (2013.01); *F16L 15/007* (2013.01); *F16L 19/00* (2013.01); *F16L 15/08* (2013.01)

(58) Field of Classification Search
CPC ..... F16L 19/061; F16L 19/062; F16L 19/065; F16L 19/06; F16L 19/10; F16L 19/103; F16L 19/12; F16L 15/006; F16L 15/008; F16L 15/007
See application file for complete search history.

(56) References Cited

U.S. PATENT DOCUMENTS

| | | | | | |
|---|---|---|---|---|---|
| 2,139,413 | A | * | 12/1938 | Kreidel | F16L 19/10 285/341 |
| 2,343,922 | A | * | 3/1944 | Parker | F16L 19/10 285/348 |
| 2,394,351 | A | * | 2/1946 | Wurzburger | F16L 19/12 285/341 |
| 2,687,315 | A | * | 8/1954 | Courtot | F16L 19/12 285/331 |

(Continued)

FOREIGN PATENT DOCUMENTS

| | | |
|---|---|---|
| FR | 8412347 | 12/1986 |
| JP | 02236087 | 9/1990 |

(Continued)

*Primary Examiner* — Matthew Troutman
*Assistant Examiner* — Alexander T Rufrano
(74) *Attorney, Agent, or Firm* — Sul Lee

(57) ABSTRACT

A pipe-fitting device according to the present invention includes a fitting body, a fixing nut, and a collet. A first end of the fitting body is rotatably connected to an outer circumferential surface of a first pipe, and a second end of the fitting body surrounds an outer surface of a second pipe. A first end of the fixing nut is rotatably connected to an outer circumferential surface of the fitting body, and a second end of the fixing nut surrounds the outer surface of the second pipe. The collet is provided inside the fixing nut and presses the second pipe when the fixing nut is rotated and tightened. The collet includes a seating portion provided inside the fixing nut, a bending portion in which a bending groove is formed, a pressing portion which presses and seals the second pipe, and a protecting portion which protects the pressing portion.

3 Claims, 6 Drawing Sheets

(56) References Cited

U.S. PATENT DOCUMENTS

| | | | | |
|---|---|---|---|---|
| 3,486,775 A * | 12/1969 | Callahan, Jr. | | F16L 19/061 285/356 |
| 3,708,186 A * | 1/1973 | Takagi | | F16L 19/12 285/341 |
| 3,830,532 A * | 8/1974 | Roberts | | F16L 19/10 285/341 |
| 3,895,832 A * | 7/1975 | Ellis | | F16L 19/14 285/322 |
| 4,043,576 A * | 8/1977 | Reich | | F16L 47/04 285/341 |
| 4,834,706 A | 5/1989 | Beck et al. | | |
| 4,871,196 A * | 10/1989 | Kingsford | | F16L 19/083 285/123.1 |
| 5,593,186 A * | 1/1997 | Harris | | F16L 19/086 285/23 |
| 6,168,211 B1 | 1/2001 | Schorn-Gilson | | |
| 6,629,708 B2 * | 10/2003 | Williams | | F16L 19/10 285/342 |
| 6,702,336 B1 * | 3/2004 | Chelchowski | | F16L 19/075 285/342 |
| 7,100,949 B2 * | 9/2006 | Williams | | F16L 19/10 285/342 |
| 7,350,828 B2 * | 4/2008 | Williams | | F16L 19/14 285/245 |
| 7,614,668 B1 * | 11/2009 | Williams | | F16L 19/10 285/249 |
| 7,900,974 B1 * | 3/2011 | Plattner | | F16L 19/061 285/332.1 |
| 7,900,976 B2 * | 3/2011 | Kainec | | F16L 13/146 285/348 |
| 8,439,404 B2 * | 5/2013 | Anton | | F16L 19/061 285/382.7 |
| 10,295,093 B2 * | 5/2019 | Anton | | F16L 19/12 |
| 11,015,748 B2 * | 5/2021 | Larson | | F16L 19/106 |
| 2006/0138771 A1 * | 6/2006 | Galante | | F16L 19/065 285/249 |
| 2006/0138774 A1 * | 6/2006 | Williams | | F16L 19/061 285/339 |
| 2008/0012301 A1 * | 1/2008 | Arstein | | F16L 19/103 285/249 |
| 2011/0227337 A1 * | 9/2011 | Kattler | | F16L 58/184 285/351 |
| 2012/0313367 A1 * | 12/2012 | Yoon | | F16L 19/103 285/93 |
| 2013/0181445 A1 * | 7/2013 | Glime | | F16L 19/065 285/337 |
| 2013/0248624 A1 * | 9/2013 | Chou | | F16L 27/1274 239/589 |
| 2016/0146383 A1 * | 5/2016 | Gibson | | F16L 19/106 285/382.4 |
| 2019/0309883 A1 * | 10/2019 | Kim | | F16L 25/14 |

FOREIGN PATENT DOCUMENTS

| | | |
|---|---|---|
| JP | 731797 | 12/1995 |
| JP | 2004526911 A | 9/2004 |
| KR | 101165203 B1 * | 7/2012 |
| KR | 20150073571 A * | 7/2015 |
| KR | 101618639 B1 | 4/2016 |

* cited by examiner

[FIG. 1]
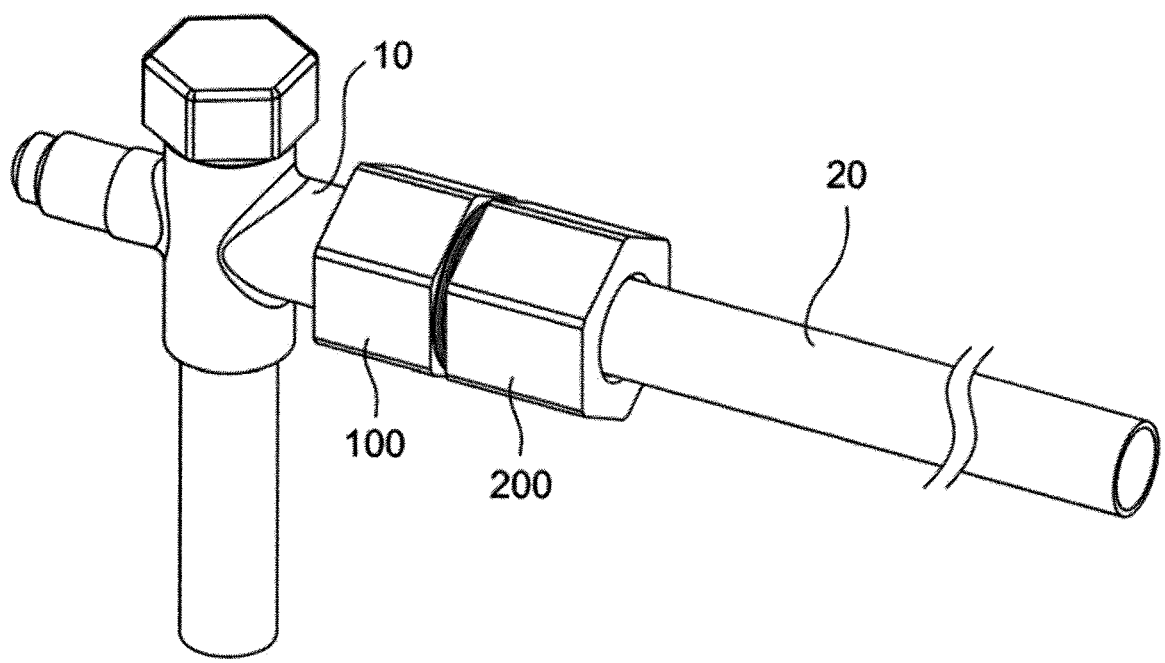
[FIG. 2]
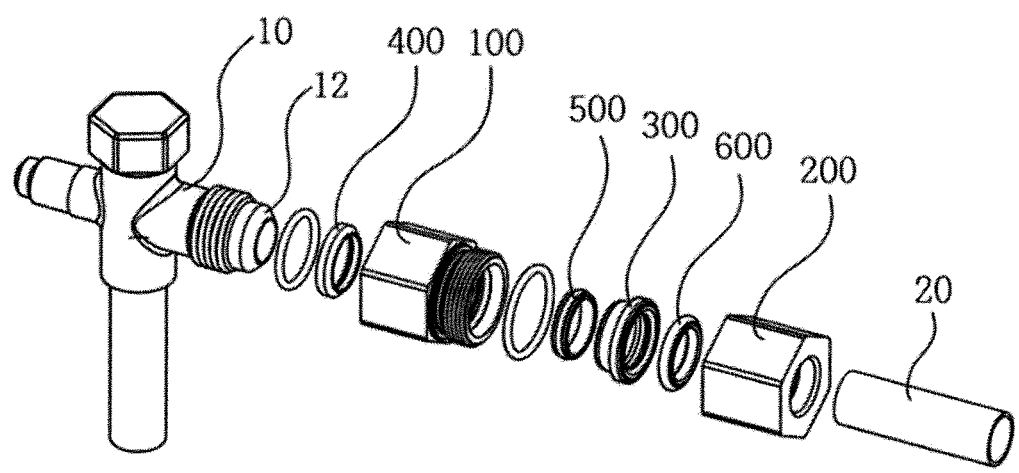

[FIG. 3]
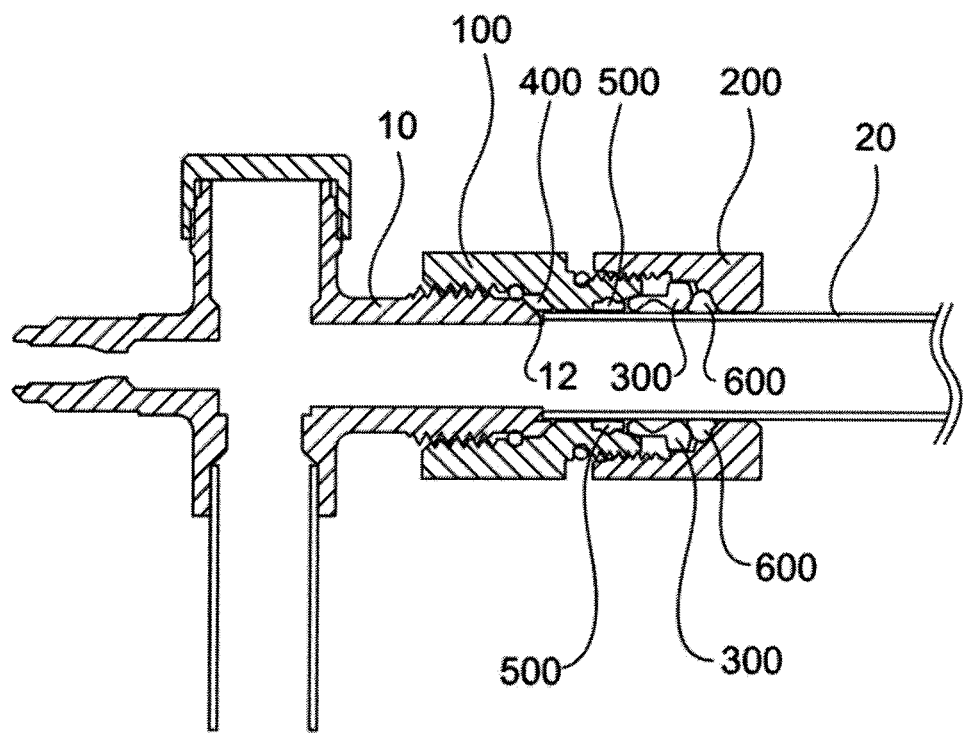
[FIG. 4]
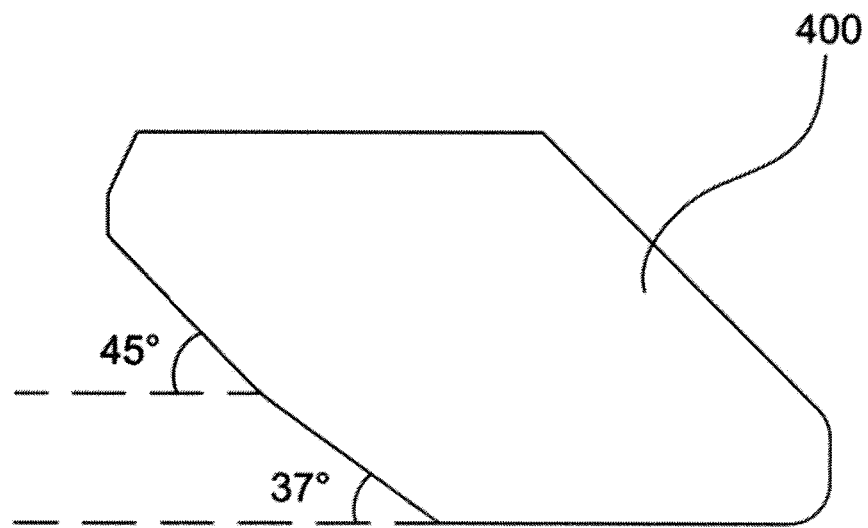

[FIG. 5]
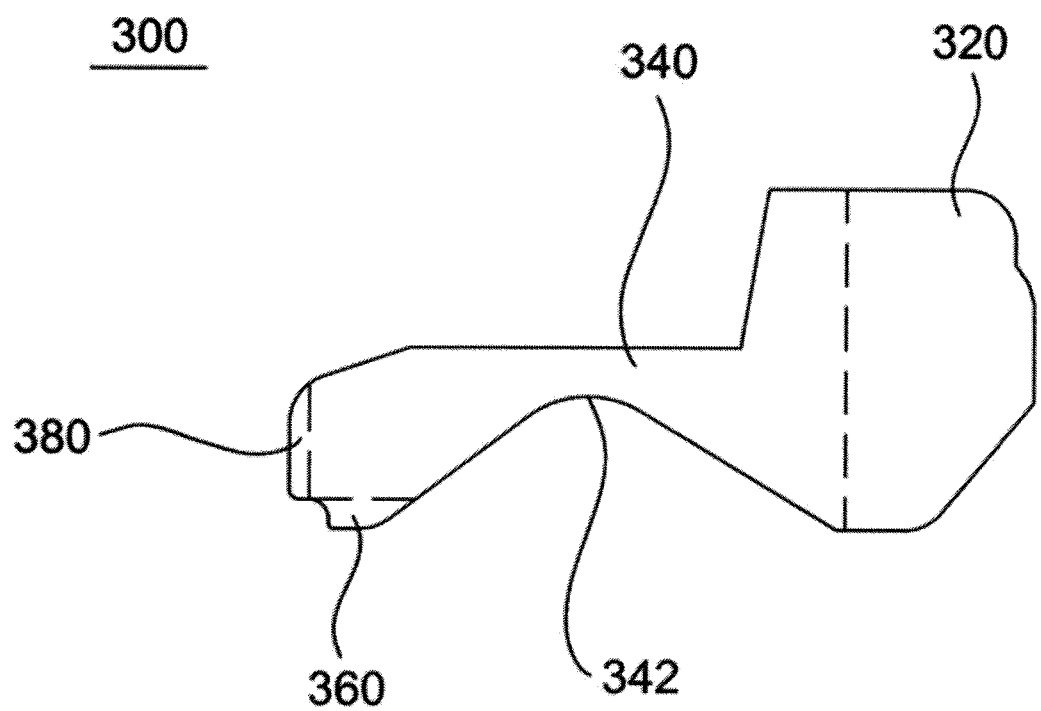

[Fig 6]
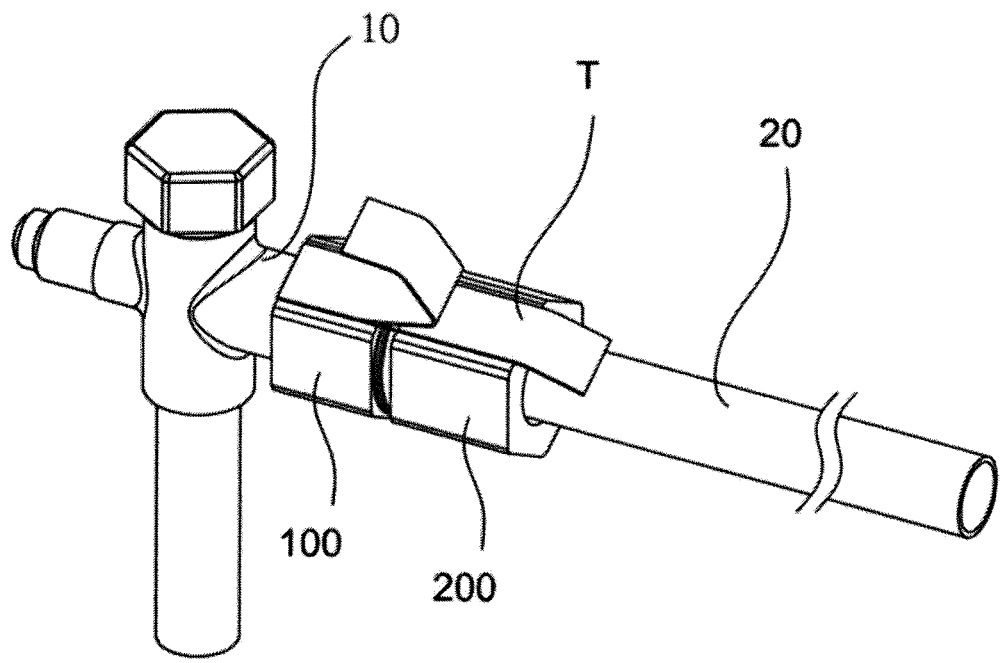
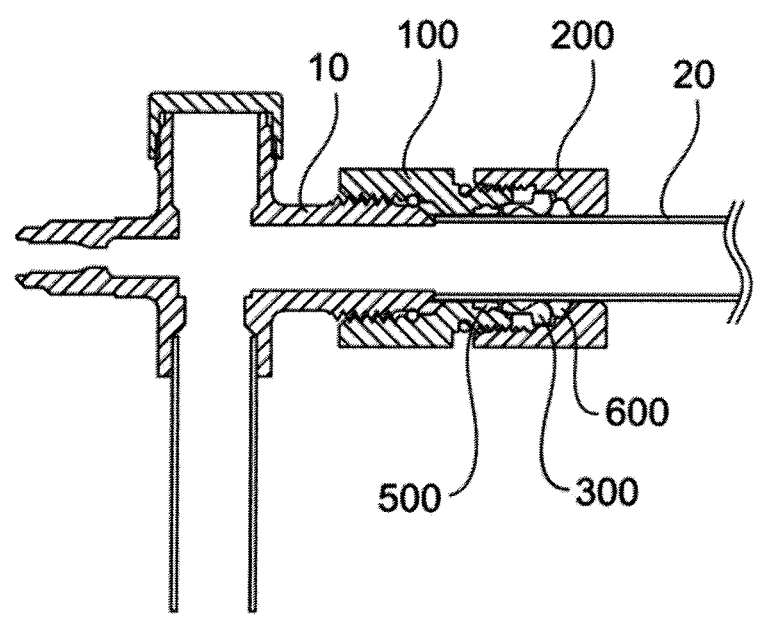

[Fig 7]
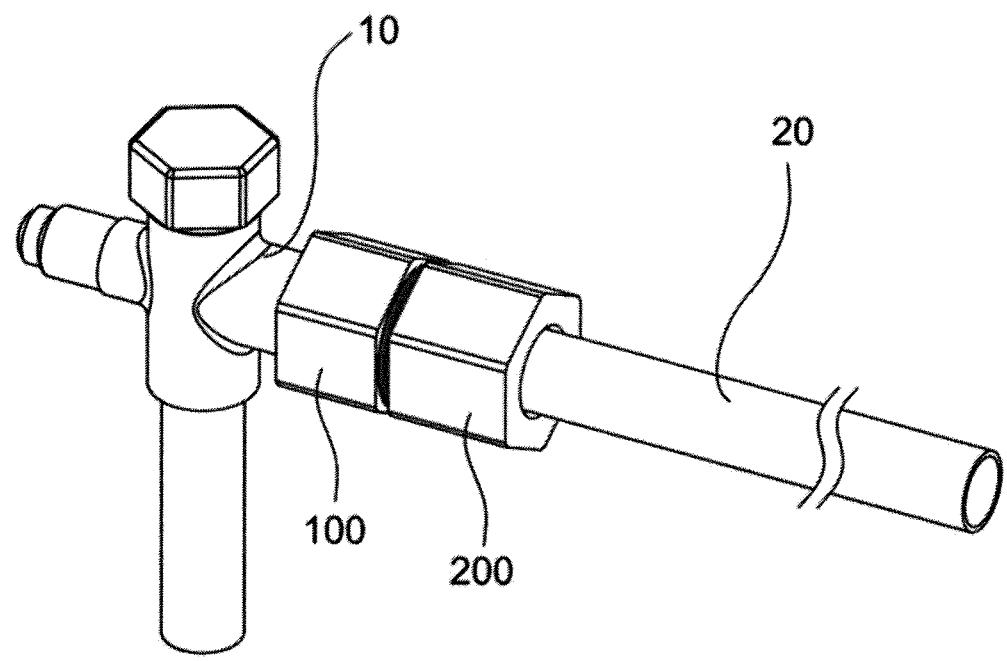
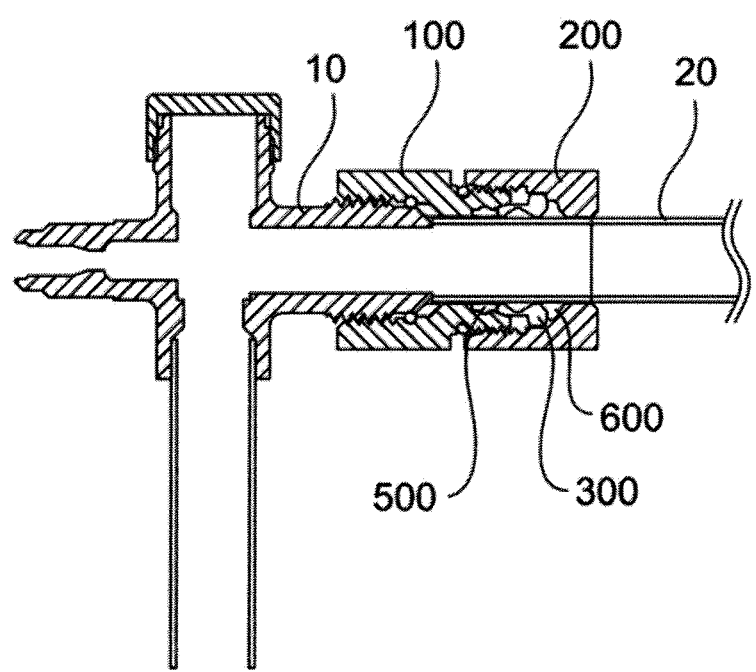

[Fig 8]
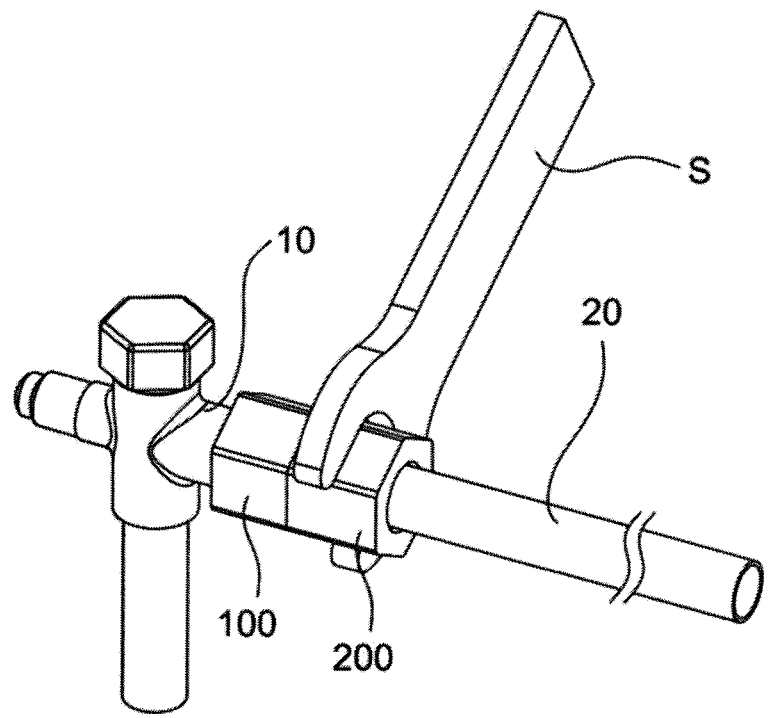
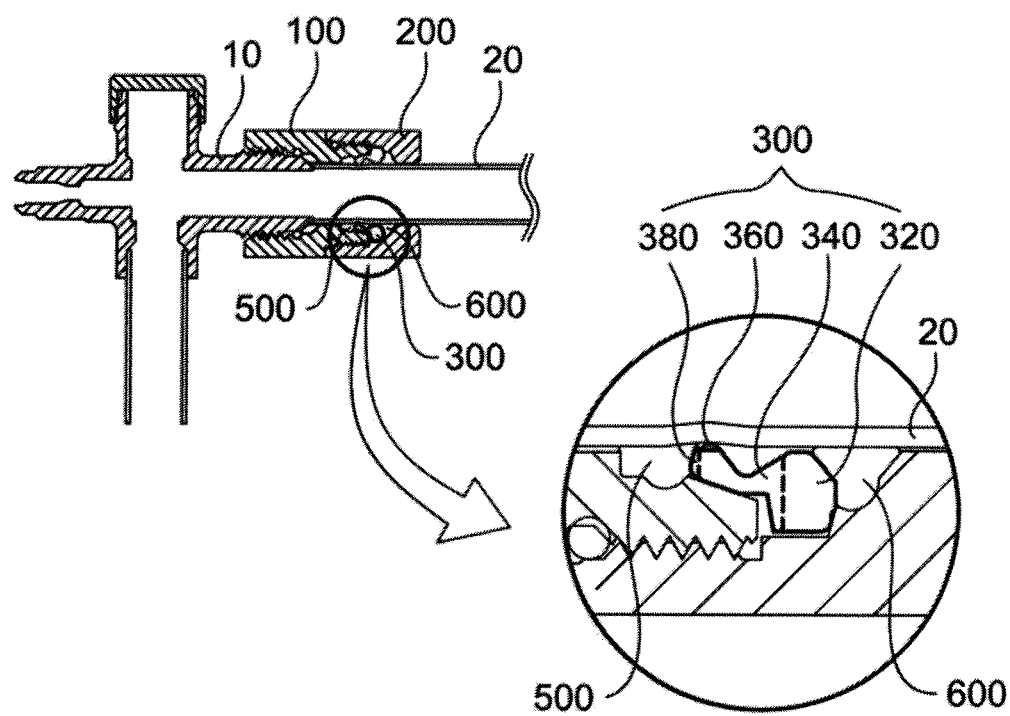

FITTING DEVICE FOR MAKING CONNECTION TUBE

CROSS-REFERENCE TO RELATED APPLICATION

This application claims the benefit of priority to Korean Patent Application No. 10-2018-0040595 filed on Apr. 6, 2018, which is incorporated by reference in its entirety.

FIELD OF THE INVENTION

The present invention relates to a pipe-fitting device, and more particularly, to a pipe-fitting device configured to connect pipes and maintain airtightness between the connected pipes.

BACKGROUND

Generally, in order to connect pipes, a pipe has to be expanded for another pipe to be inserted into the pipe, and the pipes have to be welded. However, connecting pipes by welding has disadvantages in that professional skills of an expert and working tools for welding are needed, fire hazards can occur during a welding operation, and a welding time is long.

A fitting device capable of coupling pipes using a nut has been developed to compensate for the disadvantages. Since the fitting device can be coupled by simply tightening the nut, professional skills of an expert and various working tools for welding are not needed, and a welding operation is not performed, and thus there are advantages in that there are no fire hazards, and above all, an operation time is reduced.

However, although the fitting device for connecting pipes can quickly connect pipes, there is a problem in that airtightness between the pipes have to be maintained after the pipes are connected.

SUMMARY

The present invention is directed to providing a pipe-fitting device capable of maintaining airtightness of a portion at which pipes are connected while the pipes are connected.

The present invention is also directed to providing a pipe-fitting device capable of being temporarily fixed to pipes to easily perform a pipe connecting operation while the pipes are being connected.

According to an aspect of the present invention, a pipe-fitting device includes a fitting body in which a first end portion is rotatably connected to an outer circumferential surface of a first pipe, and a second end portion surrounds an outer surface of a second pipe, wherein an inclined surface is tapered and formed inside the fitting body at a depth from the first end portion of the fitting body, and a gap is formed between the fitting body and the second pipe; a fixing nut in which a first end portion of the fixing nut is rotatably connected to an outer circumferential surface of the second end portion of the fitting body, and a second end portion of the fixing nut surrounds the outer surface of the second pipe; and a collet which is provided inside the fixing nut and presses the second pipe when the fixing nut is rotated and tightened, wherein the collet includes a seating portion provided inside the fixing nut, a bending portion which is connected to the seating portion and in which a bending groove is formed inside the bending portion, wherein an end portion of the bending portion is positioned at the gap and moved thereinto when the fixing nut is tightened, and the bending portion is bent downward, a pressing portion which is formed inside the end portion of the bending portion and presses and seals the second pipe, and a protecting portion which protrudes from the end portion of the bending portion and protects the pressing portion.

The pipe-fitting device may further include a flare packing, wherein the flare packing may be provided between the first pipe and the fitting body and include a double plane surface having different inclination angles to be correspondingly pressed against a flare inclined portion of the first pipe according to an angle of the flare inclined portion.

The pipe-fitting device may further include a fixing nut packing, wherein the fixing nut packing may be placed inside the fixing nut, pressed against and fixed to the second pipe to prevent movement of the fixing nut, and pressed against the seating portion of the collet so that the collet is prevented from being pushed.

The pipe-fitting device may further include a fitting body packing, wherein the fitting body packing may be installed inside the fitting body, pressed against the second pipe, and pressed against the protecting portion when the collet moves into the gap.

An adhesive tape may be taped around outer circumferential surfaces of the fitting body and the fixing nut to prevent rotation of the fixing nut and maintain a predetermined distance between the fitting body and the fixing nut.

As described above, the following effects are expected.

First, a fixing nut is rotated and coupled to a fitting body, a collet installed inside the fixing nut is bent, and thus pipes can be pressed and sealed. In addition, since the collet is pressed, and a pressing portion which performs the sealing is protected by a protecting portion, stamping of or damage to the pressing portion due to impact of other components can be prevented.

In addition, since pipes and a pipe-fitting device are manually rotated and temporarily fixed by a fitting body packing and a fixing nut packing respectively disposed inside the fitting body and the fixing nut, and are tightened by a spanner, a separate fixing device is unnecessary.

BRIEF DESCRIPTION OF THE DRAWINGS

FIG. 1 is a perspective view illustrating a pipe-fitting device according to an embodiment of the present disclosure.

FIG. 2 an exploded perspective view illustrating the pipe-fitting device according to the embodiment of the present disclosure.

FIG. 3 is a cross-sectional view illustrating a configuration of FIG. 1 according to an embodiment of the present disclosure.

FIG. 4 is an enlarged view illustrating a flare packing according to an embodiment of the present disclosure.

FIG. 5 is an enlarged view illustrating a collet according to an embodiment of the present disclosure.

FIG. 6 is a schematic view illustrating the pipe-fitting device when a first pipe connecting operation is performed according to an embodiment of the present disclosure.

FIG. 7 is a schematic view illustrating the pipe-fitting device when a second pipe connecting operation is performed according to an embodiment of the present disclosure.

FIG. 8 is a schematic view illustrating the pipe-fitting device when a third pipe connecting operation is performed according to an embodiment of the present disclosure.

DETAILED DESCRIPTION

Embodiments of the present disclosure will be described in detail with reference to the accompanying drawings.

FIG. 1 is a perspective view illustrating a pipe-fitting device according to an embodiment of the present invention, FIG. 2 an exploded perspective view illustrating the pipe-fitting device according to the embodiment of the present invention, FIG. 3 is a view illustrating a configuration of FIG. 1, FIG. 4 is an enlarged view illustrating a flare packing, and FIG. 5 is an enlarged view illustrating a collet.

Referring to FIG. 1, the pipe-fitting device according to the present disclosure includes a fitting body 100 and a fixing nut 200 which connect a first pipe 10 and a second pipe 20, and detailed structures are illustrated in FIG. 3.

Referring to FIGS. 2 and 3, main components of the pipe-fitting device according to an embodiment of the present invention are the fitting body 100, the fixing nut 200, and a collet 300, and the pipe-fitting device further includes a flare packing 400, a fitting body packing 500, and a fixing nut packing 600.

The fitting body 100 is a main body configured to connect the first pipe 10 and the second pipe 20.

The fitting body 100 is formed in an overall cylindrical shape, and an outer circumferential surface of the fitting body 100 is formed in a nut shape to be used by a spanner. In addition, the fitting body 100 has a cavity along a length in which a fluid may flow.

A female threaded portion is formed at a first end of the fitting body 100 to rotatably couple to a male threaded portion formed on an outer circumferential surface at an end of the first pipe 10. In addition, an inclined surface is formed inside of the fitting body 100 at a position deeper than that of the female threaded portion to correspond to a flare inclined portion 12 of the first pipe 10 and the flare packing 400. The flare packing 400 is capable of being pressed and sealed between the flare inclined portion 12 of the first pipe 10 and the inclined surface of the fitting body 100.

According to an embodiment, the flare packing 400 includes a double plane surface with each surface portion having a different inclination angle, as illustrated in FIG. 4, so as to be correspondingly pressed against the flare inclined portion 12 of the first pipe 10 according to an angle of the flare inclined portion 12. The angle of the flare inclined portion 12 may vary according to country but is generally 45° or 37°. As the flare packing 400 includes an inclined surface with an inclination angle of 45° and an inclined surface with an inclination angle of 37°, the flare packing 400 can be formed and used for general purposes. Here, the flare packing 400 may also be formed of a copper or aluminum material.

In addition, a male threaded portion is formed on an outer circumferential surface at the other end of the fitting body 100 for rotatably coupling to a female threaded portion inside a first end of the fixing nut 200. The inclined surface in the fitting body 100 leads to a horizontal portion that has the smaller cross-sectional area than either end of the fitting body 100 and allows the second pipe 20 to pass through. Thereafter, which surrounds an outer side of the second pipe 20 and in which an inside of an end portion of the inclined surface is tapered is formed inside the other side of the fitting body 100, and has a gap between the inclined surface and the second pipe 20 which are coupled in a horizontal direction. In addition, the fitting body packing 500 sealed with the second pipe 20 is installed inside the other side of the fitting body 100, that is, at a position which is deeper than that of the tapered inclined surface.

According to an embodiment, the fitting body packing 500 is a component which is pressed against both the fitting body 100 and the second pipe 20 and seals the fitting body 100 and the second pipe 20, is formed of a rubber material, and is pressed against the collet 300 when the fixing nut 200 is tightened against the fitting body 100.

According to an embodiment, the fixing nut 200 is a component for tightening against the fitting body 100 to fix the second pipe 20.

The first end of the fixing nut 200 is rotatably connected to the outer circumferential surface at the second end of the fitting body 100. The second (opposite) end of the fixing nut 200 surrounds the outer surface of the second pipe 20.

In addition, the fixing nut packing 600 is inserted into and installed in the fixing nut 200 through the first end, and then the collet 300 is installed in the fixing nut 200 through the first end thereafter.

According to an embodiment, the fixing nut packing 600 is a component capable of being pressed against the second pipe 20 to be temporarily fixed against the second pipe 20 when the second pipe 20 is inserted into the fixing nut 200, and is formed of a rubber material.

According to an embodiment, the collet 300 is a component which is formed in a ring shape and is for pressing against and sealing the second pipe 20 when the fixing nut 200 is tightened toward the fitting body 100.

According to an embodiment, the collet 300 moves into a gap between the fitting body 100 and the second pipe 20 to press against the second pipe 20 when the fixing nut 200 is rotated and tightened.

According to an embodiment, the collet 300 includes a seating portion 320, a bending portion 340, a pressing portion 360, and a protecting portion 380, all integrally formed as illustrated in FIG. 5.

Specifically, the collet 300 includes the seating portion 320 positioned inside the fixing nut 200 and formed in a ring shape, the bending portion 340 which extends from the seating portion 320 and in which a bending groove 342 is formed at the inner side of the bending portion. An end portion of the bending portion 340 is positioned at the opening of the gap between the fitting body and the second pipe 20 and is pushed into the gap when the fixing nut 200 is tightened, causing the bending portion 340 to be bent downward at the bending groove 342. The pressing portion 360 is formed at the inner side proximate to the end portion of the bending portion 340 and presses against and seals the second pipe 20. The protecting portion 380 protrudes from the end portion of the bending portion 340 and protects the pressing portion 360.

As illustrated in FIG. 3, the collet 300 is moved toward the fitting body 100 and pressed when the fixing nut 200 is tightened. When the end portion of the bending portion 340 (see FIG. 5) is moved into the gap, the end portion of the bending portion 340 is moved along the tapered inclined surface of the fitting body 100 and pressed. The collet 300 is bent at the bending groove 342, and the pressing portion 360 (see FIG. 5) formed on an inner surface at the end portion of the bending portion 340 (see FIG. 5) presses against and seals an outer circumferential surface of the second pipe 20.

Through forming of the protecting portion 380, the pressing portion 360 is prevented from coming into contact with another component and protected, and because the protecting portion 380 is formed in front of the pressing portion 360, the pressing portion 360 may be prevented from directly coming into contact with the fitting body packing 500, and thus the pressing portion 360 may be prevented from stamping of the fitting body packing 500 and the protecting portion 380 may also protect the fitting body packing 500.

Next, a method of using the pipe-fitting device will be described according to the present invention.

FIG. 6 is a schematic view illustrating the pipe-fitting device when a first pipe connecting operation is performed, FIG. 7 is a schematic view illustrating the pipe-fitting device when a second pipe connecting operation is performed, and FIG. 8 is a schematic view illustrating the pipe-fitting device when a third pipe connecting operation is performed.

A sequence of the method of connecting the pipe-fitting device is in the order of FIGS. 6, 7, and 8.

Referring to FIG. 6, first, the fitting body 100 and the fixing nut 200 are temporarily coupled. While the outer surfaces of the fitting body 100 and the fixing nut 200 are fixed by a tape T, the fitting body 100 and the fixing nut 200 are not tightened and loosened, thereby allowing the second pipe 20 to be inserted. This is because, if the fitting body 100 and the fixing nut 200 are tightened so tightly, the fitting body packing 500 and fixing nut packing 600 are compressed and the second pipe 20 cannot be inserted through the fixing nut packing 600 and fitting body packing 500. Because the fixing nut 200 coupled to the fitting body 100 can move along the outer circumferential surface of the second pipe 20, there is an advantage in that the second pipe may be positioned to an accurate length before the fixing nut is tightened. In addition, after removing the tape T, the fitting body 100 is rotated and coupled to the first pipe 10 to compress the flare packing 400, and the fitting body 100 and the first pipe 10 are made to be airtight.

Next, referring to FIG. 7, when the fixing nut 200 coupled to the fitting body 100 is manually rotated and tightened, the fixing nut packing 600 is compressed, and the second pipe 20 is temporarily fixed to the fixing nut 200.

Next, referring to FIG. 8, when the fixing nut 200 is further rotated and tightened toward the fitting body 100 by a spanner S, the collet 300 is compressed, so that the bending portion 340 is transformed and the pressing portion 360 presses the second pipe 20, thereby being made airtight. Meanwhile, the protecting portion 380 compresses the fitting body packing 500 such that the second pipe 20 is compressed, thereby being made airtight.

The scope of the present invention is not limited to the above-described specific embodiments. Various other embodiments that may be changed or modified by those skilled in the art without departing from the scope and spirit of the present invention defined by the appended claims fall within the scope of the present invention.

The invention claimed is:

1. A pipe-fitting device comprising:
    a fitting body comprising a first end portion comprising an inner threaded portion, a second end portion comprising an outer threaded portion and an inner inclined surface that narrows from the second end of the fitting body, and a narrowest portion between the first end portion of the fitting body and the second end portion of the fitting body;
    a fixing nut comprising a first end portion configured to rotatably couple to the outer threaded portion of the second end portion of the fitting body, and a second end portion of the fixing nut comprising an inner circumference that is narrower than an inner circumference of the first end portion of the fixing nut;
    a fitting body packing provided at a depth inside the second end portion of the fitting body;
    a flare packing provided inside a cavity of the first end portion of the fitting body and comprising a double piano surface having different inclination angles;
    a fixing nut packing placed inside the fixing nut; and
    a collet which is provided inside the fixing nut abutting the fixing nut packing and configured to press inward when the fixing nut is rotated and tightened,
    wherein the collet includes a seating portion provided inside the fixing nut, a bending portion which is connected to the seating portion and in which a bending groove is formed at the inner side of the bending portion, an end portion of the bending portion positioned inside the second end of the fitting body such that when the fixing nut is tightened, the end portion of the bending portion is moved into the second end portion of the fitting body along the inner inclined surface causing the bending portion to be bent inward at the bending groove, a pressing portion which protrudes from an inner side of the end portion of the bending portion and is configured to press and seal when a pipe has been inserted into the fitting body through the second end of the fixing nut, and a protecting portion which protrudes from the end portion of the bending portion in front of the pressing portion and is proximate to the fitting body packing so as to abut the fitting body packing when the fixing nut is tightened.

2. The pipe-fitting device of claim 1, wherein the fixing nut packing is placed inside the fixing nut for preventing movement of the fixing nut when the pipe has been inserted into the fitting body through the second end of the fixing nut, by pressing the fixing nut packing against the pipe, the fixing nut packing pressed against the seating portion of the collet so that the collet is prevented from being pushed.

3. The pipe-fitting device of claim 1, wherein an adhesive tape is taped over outer circumferential surfaces of the fitting body and the fixing nut to prevent rotation of the fixing nut and to maintain a predetermined distance between the fitting body and the fixing nut.

\* \* \* \* \*